United States Patent [19]

Sawyer et al.

[11] 3,797,207

[45] Mar. 19, 1974

[54] CROP HARVESTING MACHINE

[75] Inventors: Bobby Gene Sawyer; J. Clark Fickle, both of Wapello, Iowa

[73] Assignee: Deere & Company, Moline, Ill.

[22] Filed: July 5, 1972

[21] Appl. No.: 268,976

[52] U.S. Cl. .................................................... 56/1
[51] Int. Cl. ............................................ A01d 43/00
[58] Field of Search .......... 56/1, DIG. 1, 14.9, 14.4, 56/14.5, 15.8, 20 B

[56] References Cited
UNITED STATES PATENTS
3,517,491   6/1970   Lausch et al. ..................... 56/14.9 X Primary Examiner—Louis G. Mancene
Assistant Examiner—J. A. Oliff

[57] ABSTRACT

A crop harvesting machine including a longitudinal frame portion adapted at its forward end for attachment to a draft vehicle, a transverse frame portion fixed at its left end to the rearward end of the longitudinal portion, a pair of upright frame members fixed to opposite sides of the transverse frame portion, a pair of transversely spaced wheel arms connected to the transverse frame portion for vertical swinging movement and having ground-engaging wheels rotatably mounted thereon, extensible and retractable means acting between the upright frame members and the wheel arms to vertically swing the latter and thereby raise and lower the frame relative to the ground, a header subframe carrying crop harvesting elements thereon, the header extending longitudinally above the transverse frame portion and between the upright frame members, upper and lower links mounting the header on the frame, the upper links extending between the header and the upper ends of the upright frame members and the lower links extending between the header and the wheel arms, and elongated springs acting between the transverse frame portion and the header to urge the latter upwardly relative to the former. In one embodiment, the springs extend between the upper ends of the upright frame members and the header, and in another embodiment, the springs extend between the upper links and the header.

21 Claims, 9 Drawing Figures

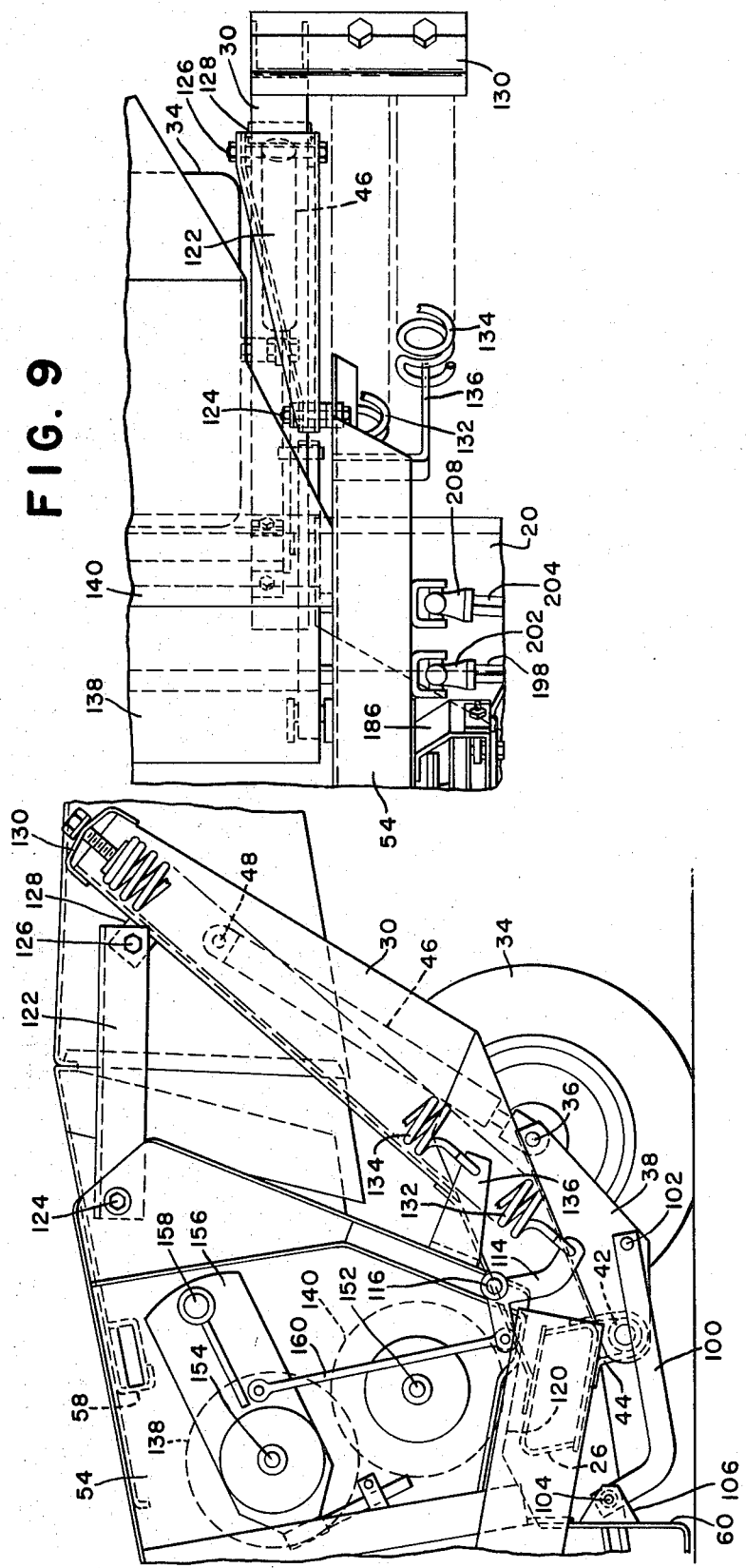

CROP HARVESTING MACHINE

BACKGROUND OF THE INVENTION

The present invention relates generally to crop harvesting machines and more particularly to a frame structure and header suspension mechanism for a crop harvesting machine of the mower-conditioner type.

A conventional pull-type mower-conditioner includes an L-shaped main frame adapted at its forward end for attachment to the drawbar of a tractor and having a transversely spaced pair of ground-engaging wheels mounted on its transverse rear portion and adapted to support the frame for movement through a field. Suspended from the transverse frame portion is a subframe or header having a transverse cutter bar disposed along its lower leading edge and adapted to cut a swath of crop material as the machine is advanced forwardly, an upper and lower pair of crop conditioning rolls mounted upwardly and rearwardly from the cutter bar, the conditioning rolls being operative to condition the stems of the cut crop material and discharge the crop along a curved path extending rearwardly from the rolls and thence downwardly to the ground, and a harvesting reel for directing the standing crop into the cutter bar and transferring the cut crop upwardly and rearwardly from the cutter bar to the conditioning rolls. Adjustable deflector means are included at the rear of the header for selectively deflecting the swath of crop material discharged from the conditioning rolls either into a relatively wide swath or a relatively narrow windrow.

Various frame configurations and header suspension mechanisms have been employed on machines of this type in the past, examples of which are disclosed in U.S. Pat. Nos. 3,474,601 issued Oct. 28, 1969 to Burrough et al., 3,517,491 issued June 30, 1970 to Lausch et al. and 3,550,363 issued Dec. 29, 1970 to Halls et al.

SUMMARY OF THE INVENTION

It is a primary object of the invention to provide a crop harvesting machine of the mower-conditioner type having an improved frame construction and header suspension means.

It is a more particular object of the invention to provide such a machine having improved header flotation characteristics and thus improved cutter bar gauging characteristics.

It is a further object of the invention to provide such a machine having a rigid, yet simple and economical frame construction.

It is another object of the invention to provide such a machine having a header suspension linkage including stop means for limiting the relative upward movement of the header when the frame is raised to a transport position.

In pursuance of these and other objects, the crop harvesting machine of the invention comprises, generally, a longitudinal frame portion adapted at its forward end for attachment to a draft vehicle, a transverse frame portion fixed at its left end to the rearward end of the longitudinal portion, a pair of upright frame members fixed to opposite sides of the transverse frame portion, a pair of transversely spaced wheel arms connected to the transverse frame portion for vertical swinging movement and having ground-engaging wheels rotatably mounted thereon, extensible and retractable means acting between the upright frame members and the wheel arms to vertically swing the latter and thereby raise and lower the frame relative to the ground, a header subframe carrying crop harvesting elements thereon, the header extending longitudinally above the transverse frame portion and between the upright frame members, upper and lower links mounting the header on the frame, the upper links extending between the header and the upper ends of the upright frame members and the lower links extending between the header and the wheel arms, and elongated, vertically extending springs acting between the transverse frame portion and the header to urge the latter upwardly relative to the former. In one embodiment of the invention, the springs extend between the upper ends of the upright frame members and the header, while in another embodiment, the springs extend between the upper links and the header. In both embodiments, the springs act through bell cranks on the header to bias one of the crop conditioning rolls mounted thereon toward its cooperating roll.

The lower links mounting the header to the frame are pivotally connected at their rearward ends to intermediate portions of the wheel arms and extend forwardly beneath the transverse frame portion and are pivotally connected at their forward ends to the header. During normal operation, the upper side of the lower links are thus engageable with the lower side of the transverse frame portion to limit the upward movement of the header relative to the frame. Downward movement of the header relative to the transverse frame portion is limited by the lower side of the former engaging the upper side of the latter. When the wheel arms are swung downwardly to raise the machine for transport, the rear pivotal connections of the lower links on the wheel arms are swung downwardly and forwardly, thereby altering the geometry of the header suspension linkage. As a result, the lower links engage a stop on the header to limit the upward movement of the header relative to the lower links when the machine is in its transport position.

BRIEF DESCRIPTION OF THE DRAWINGS

The preferred embodiments of the present invention will be described in conjunction with the accompanying drawings in which:

FIG. 8 is a fragmentary left side elevational view of the machine showing a modified header suspension spring mounting; and FIG. 9 is a fragmentary plan view of the modified spring mounting of FIG. 8.

DESCRIPTION OF THE PREFERRED EMBODIMENTS

In the ensuing description, right- and left-hand reference is determined by facing the direction of travel of the machine.

Figure 5:
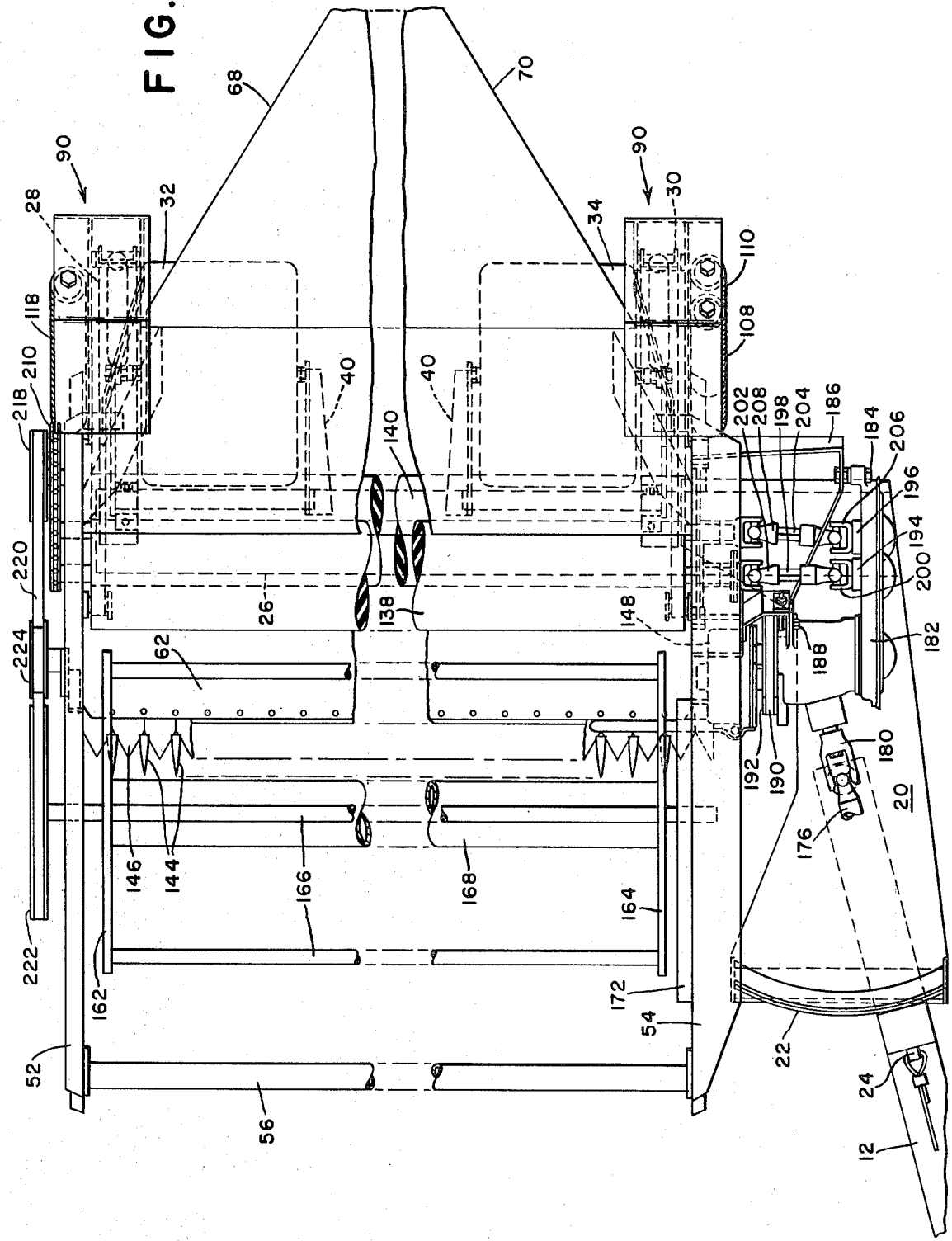
FIG. 5 is a plan view of the machine.

Referring now to the drawings, the preferred embodiment of the invention includes a generally L-shaped main frame structure comprised of a longitudinal draft portion 10 on the left side of the machine and a transverse portion 11 connected at its left end to the rear of the draft portion. The longitudinal portion consists of a tongue member 12 adapted at its forward end for attachment to the drawbar 14 of a draft vehicle in the form of a conventional agricultural tractor shown partially at 16, and pivotally mounted at its rear end by means of a generally vertical pin 18 between the upper and lower sides of a box frame section 20. The section 20 has an arcuate leading edge member 22 provided with a plurality of spaced apertures into which a pin 24 carried by the tongue 12 is releasably positionable to secure the tongue 12 in various angular positions of adjustment relative to the section 20. In FIG. 5, the tongue 12 is illustrated in its extreme left position. To narrow the tractor-machine combination for transport purposes, the tongue would be swung to and secured in its extreme right position.

Figure 1:
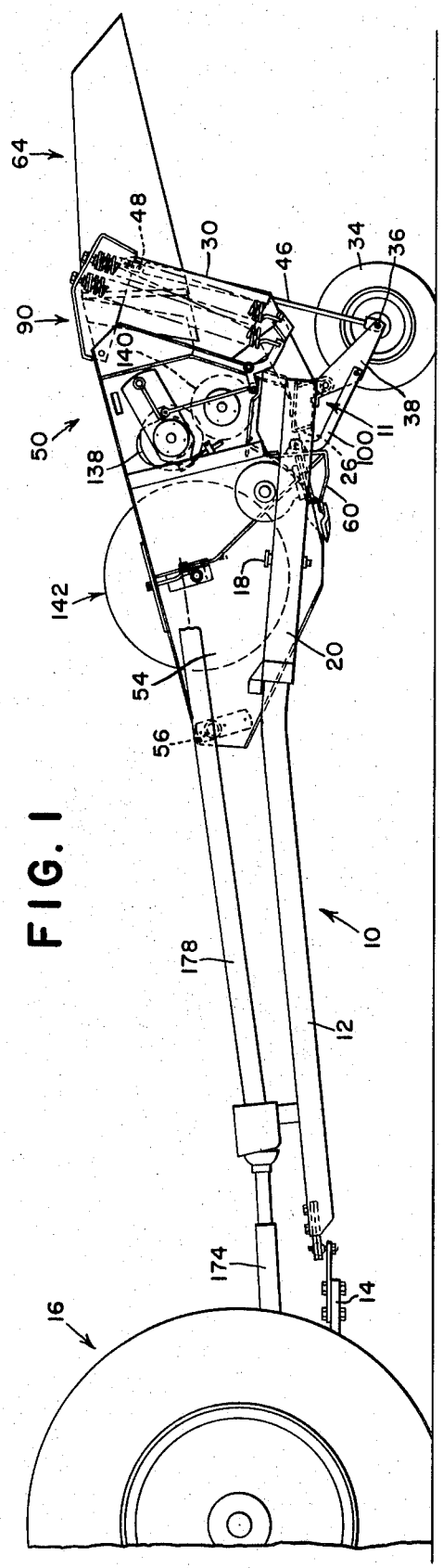
FIG. 1 is a somewhat schematic, side elevational view of a crop harvesting machine constructed in accordance with the principles of the invention, showing the machine in its raised, transport position.
Figure 2:
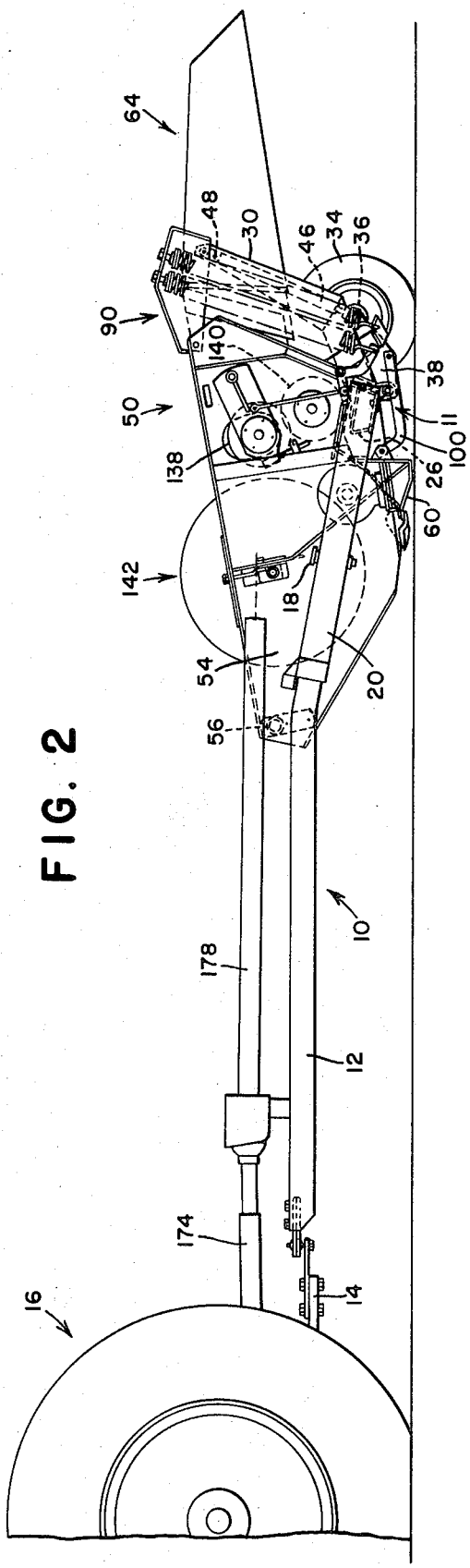
FIG. 2 is a side elevational view similar to FIG. 1 but showing the machine in its lowered, operating position.

Fixed at its left end to the right rear portion of the section 20 is a transverse beam 26 having a transversely spaced pair of upwardly and rearwardly extending upright frame members 28 and 30 fixed to its right and left ends, respectively. A right and left pair of relatively wide, small diameter wheels 32 and 34, respectively, support the main frame structure relative to the ground, the wheels 32 and 34 being mounted on the transverse beam 26 just inwardly of the members 28 and 30, respectively. Each wheel is rotatably supported on a transverse axle 36 extending between the rear ends of an outer wheel supporting arm 38 and an inner wheel supporting arm 40, the arms 38 and 40 being interconnected at their forward ends by means of a tubular member 42 which is rotatably received in a bracket 44 fixed to the lower rear corner of the transverse beam 26. The upright frame members 28 and 30 are each composed of a rearwardly opening, U-shaped channel, and disposed between the walls of each member is an extensible and retractable hydraulic cylinder 46 for raising and lowering the wheels relative to the frame and thereby raising and lowering the frame relative to the ground. The upper end of each cylinder 46 is pivotally connected at 48 between the walls of its respective frame member, and the lower end thereof is pivotally connected to the extreme outer end of the adjacent wheel axle 36. FIG. 1 illustrates the hydraulic cylinders 46 in their extended positions and the machine in its raised transport position, while FIG. 2 illustrates the hydraulic cylinders in their retracted positions and the machine in its lowered operating position. The cylinders 46 are connected by conventional means (not shown) with a hydraulic fluid source on the tractor to extend and retract at the same rate of speed, so that the machine is maintained in a transversely level condition as it is raised and lowered.

Suspended from the transverse portion 26 of the main frame 10 is a subframe or header 50 which carries the various harvesting elements of the machine. The header is formed of right and left side panels 52 and 54, respectively, interconnected at their forward ends by a transverse crop-engaging bar 56, at their upper rear ends by means of a transverse upper beam member 58, and at their lower center portions by a transverse lower beam member 60 and a transverse arcuate ramp 62. Fixed to and extending rearwardly from the side panels 52 and 54 and the upper beam 58 is a downwardly opening crop deflector hood structure designated generally by the numeral 64 and formed by a generally horizontal top wall 66, a right and left pair of rearwardly converging, generally vertical side walls 68 and 70, respectively, fixed to and extending downwardly from opposite sides of the top wall 66, and a downwardly and rearwardly inclined rear wall 72 interconnecting the rear edges of the top wall 66 and side walls 68 and 70. As is apparent from the drawings, the hood structure 64 is positioned in overlying relation to the ground wheels 32 and 34, the latter being located directly beneath the top wall 66 and between the side walls 68 and 70.

As described in detail in copending application Ser. No. 268,562, the small diameter ground wheels 32 and 34 are located rearwardly of and within the transverse extent of the mowing apparatus and conditioning rolls so that the crop discharged rearwardly from the rolls passes directly over the wheels before it falls to the ground. Also described in this copending application, though forming no part of the present invention, are crop deflector means which may be carried by the hood structure 64, the deflector means being adjustable to form the discharged crop in either a relatively wide swath or a relatively narrow windrow.

The subframe or header 50 extends longitudinally between the upright frame members 28 and 30 and is suspended from the transverse portion of the main frame 10 by means of a mechanism which permits the header to "float" relative to the main frame and thereby closely follow the contour of the ground and raise to clear obstructions which are encountered. This mechanism comprises, generally, upper and lower pairs of transversely spaced links which interconnect the header 50 and main frame, and tension spring means acting between the frame and the header to urge the latter upwardly relative to the former. Two separate embodiments of the suspension mechanism are illustrated in the drawings. Referring first to FIGS. 1–7 of the drawings, the mechanism illustrated therein includes a pair of mirror image upper link members 90 formed of identical inner and outer, transversely spaced vertical plates 92 interconnected along their upper and rear edges by means of a transverse plate 94, the latter including a portion substantially overhanging the outer plate 92. The rear portions of the vertical plates 92 of the left link 90 extend on opposite sides of the upper end of the member 30 which is fixed to and extends upwardly and rearwardly from the transverse beam 26. A pin 96 extends through aligned apertures in the plates 92 and member 30 to pivotally connect the left link 90 to the main frame. In like manner, the vertical plates 92 of the right link 90 extend on opposite sides of the upper end of the member 28 and are pivotally connected thereto. The forward portions of the plates 92 of the left link 90 are pinned at 98 to the left side panel 54 of the header 50, and, similarly, the forward portions of the plates 92 of the right link 90 are pinned to the right side panel 52 of the header. The suspension mechanism illustrated in FIGS. 1–7 further includes a pair of lower link members 100, the rear ends of which are pivotally connected at 102 to the center portion of the outer wheel arms 38, and the front ends of which are pivotally connected at 104 to brackets 106 fixed to the rear wall of the transverse header beam 60.

A pair of fore-and-aft float springs 108 and 110 respectively, act between the left upper link 90 and the header to resiliently support the left side of the header relative to the main frame, the springs being anchored at their upper ends to the overhanging portion of the transverse plate 94. The lower end of the rear spring 110 is anchored to a bracket 112 which is fixed to and extends rearwardly from the left side panel 54 of the header, while the lower end of the front spring 108 is anchored to one arm of a bell crank 114 pivotally mounted at 116 on the side panel 54. As will subsequently appear, the spring 108 acts through the bell crank 114 to provide a biasing force for the crop conditioning rolls on the header. Since the weight of the right side of the header 50 is somewhat less than that of the left side, only a single float spring 118 is employed to support this side of the header. The spring 118 is anchored at its upper end to the overhanging portion of the plate 94 of the right link 90 and at its lower end to a bell crank 114 pivotally mounted on the right header side panel 52.

Figure 3:
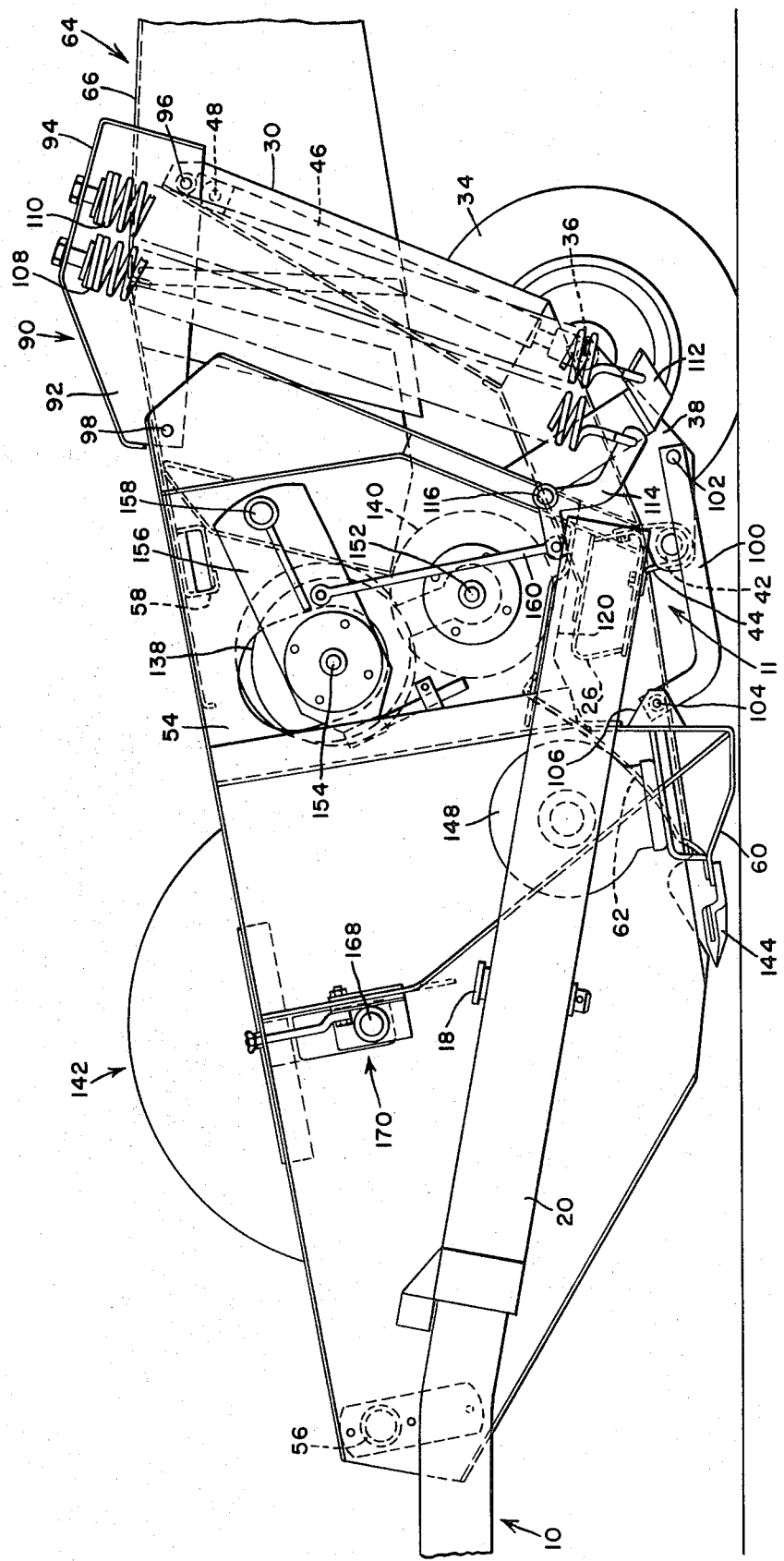
FIG. 3 is an enlarged, fragmentary left side elevational view of the machine with portions removed for the sake of clarity, showing the frame structure and header suspension mechanism in greater detail, the header being shown in its normal operating position.
Figure 4:
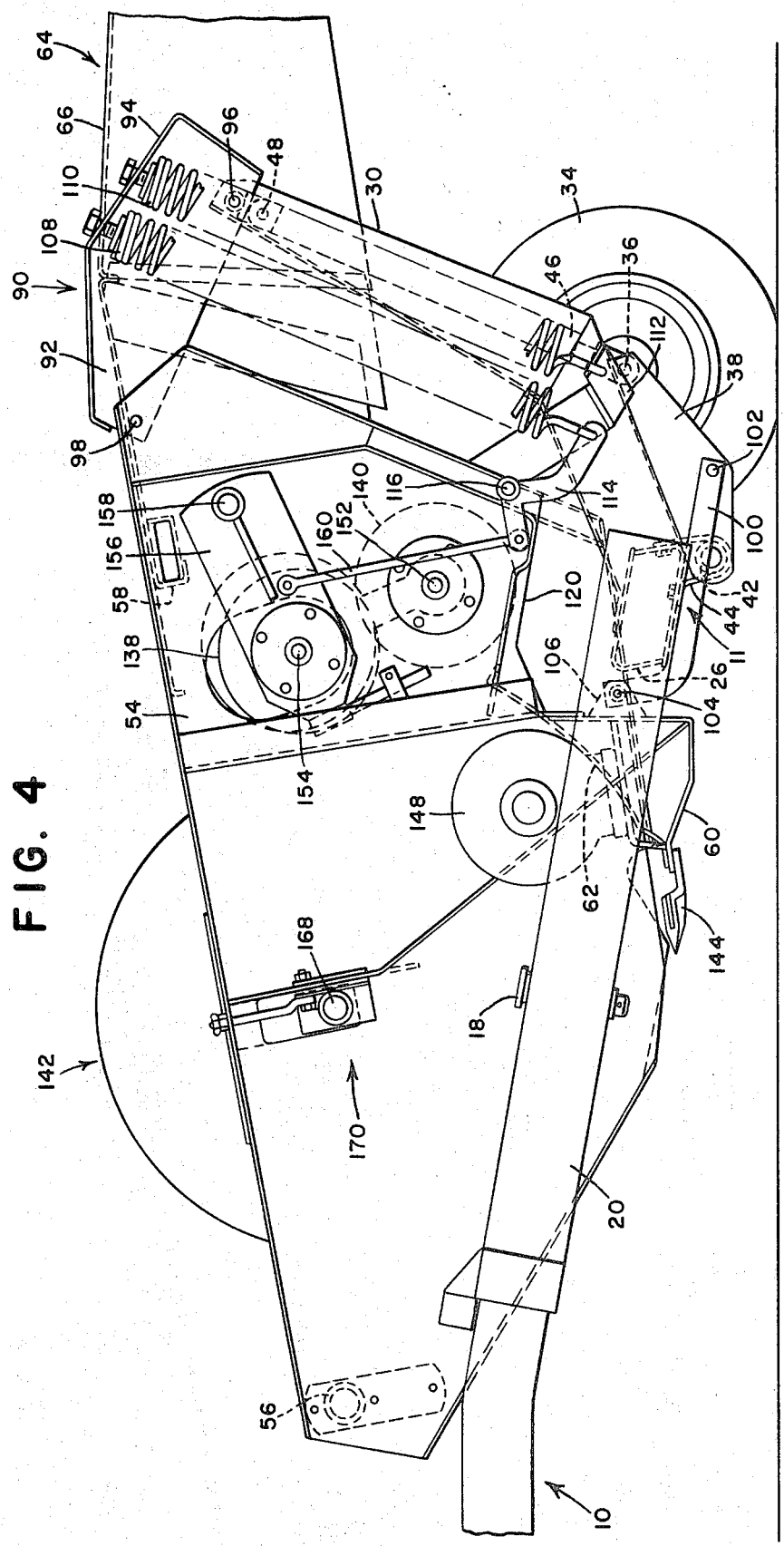
FIG. 4 is a side elevational view similar to FIG. 3 but showing the header raised to its maximum height position relative to the frame.

It will be apparent that, with the machine in its lowered, operating position, the upper and lower links of the suspension mechanism act as parallel link means to maintain the header in a constant orientation relative to the ground as it floats to follow the ground contour. FIG. 3 illustrates the header in its normal operating position relative to the frame. Should the leading edge of the header strike an obstruction, the header is free to move upwardly relative to the frame to clear the obstruction as shown in FIG. 4. The maximum height position of the header relative to the transverse frame member 26, as shown in this figure, is defined by the point at which the upper side of the lower link 100 contacts the lower side of the member 26. Similarly, the minimum height position of the header relative to the transverse frame member 26 is defined by the point at which the lower side portion 120 of the header contacts the upper side of the member 26. When the machine is raised to its transport position of FIG. 1, the lower links 100 are no longer parallel to the upper links 90, since the pins 102 connecting the rear ends of the links 100 to the wheel arms 38 are moved downwardly and forwardly relative to the main frame. The forward movement of the pin 102 is transmitted to the header transverse beam via the link 100, causing the header to swing upwardly relative to the main frame for additional transport height. Still referring to FIG. 1, it will be seen that when the machine is raised the leading edges of the lower links 100 contact the rear wall of the header transverse beam 60, the beam 60 thereby acting as a stop member to limit the upward flotation of the header relative to the lower links for transport purposes, and thus to increase the transport stability of the machine.

A slightly modified header suspension mechanism is illustrated in FIGS. 8 and 9, wherein the same reference numerals are used as in FIGS. 1–7 to indicate elements common to the two embodiments. Although only the left side of the machine is illustrated in these figures, the right side is substantially identical to the left side with the exception of those changes described below. The embodiment illustrated in FIGS. 8 and 9 is similar to that already described in that it employs generally the same frame configuration, with the exception that the upright member 30 is shaped somewhat differently and is disposed at a slightly greater angle from a vertical line. The wheel arm 38 and wheel 34 are the same, as is the hydraulic cylinder 46 employed to swing the arm 38 about its pivotal connection with the transverse frame portion, and the lower link 100 interconnecting the wheel arm 38 with the header. The principal differences between the two embodiments reside in the upper link construction and float spring mounting. The embodiment of FIGS. 8 and 9 includes an upper link 122, the forward end of the link being pivotally connected to the left header side panel 54 by a pin 124, and the rear end thereof being pivotally connected by means of a pin 126 to a bracket 128 fixed to the front side of the upright frame member 30. Despite the different shapes of the links 90 and 122, it will be apparent from a comparison of FIGS. 3 and 8 that the locations of the pivotal connections of the links to the header and upright frame member are substantially the same in both embodiments and that the geometry of the header suspension linkage is thus unchanged.

In the embodiment illustrated in FIGS. 8 and 9, however, the float springs which act to urge the header upwardly relative to the frame are mounted at their upper ends not to the upper link but rather directly to the upper end of the frame member 30. A channel member 130 is fixed to the upper end of the frame member 30 and extends transversely outwardly therefrom. An inner end outer pair of float springs 132 and 134, respectively, are anchored at their upper ends to the channel member 130, the inner spring 132 being connected at its lower end to the bell crank 114, and the outer spring 134 being connected at its lower end to a bracket 136 which is fixed to and extends outwardly and rearwardly from the left side panel 54 of the header. Although not shown in the drawings, the right side of a machine constructed in accordance with the embodiment illustrated in FIGS. 8 and 9 includes only a single spring interconnecting a bracket extending outwardly from the upper end of the upright frame member 28 and one arm of the right bell crank 114. Since the geometry of the suspension linkage comprising this embodiment is substantially the same as that comprising the embodiment of FIGS. 1–7, it will be appreciated that the description of the operation of the first embodiment as it relates to the manner in which vertical movement of the header relative to the transverse frame portion 26 is limited, and also to the transport configuration and characteristics of the machine, apply equally to the embodiment of FIGS. 8 and 9.

The harvesting components carried by the header include a conventional, reciprocating-type mowing apparatus extending transversely across the front side of the lower transverse beam 60, the apparatus being operative to mow a swath of crop material as the machine is advanced forwardly through a field; an upper and lower pair of intermeshing crop conditioning rolls 138 and 140, respectively, the rolls being operative to condition the mowed crop by cracking the stems thereof to facilitate the escape of moisture; and a conventional, retractable finger-type reel 142 mounted above the mowing apparatus and forwardly of the conditioning rolls to direct standing crop into the mower and advance the mowed crop up the arcuate ramp 62 from the mower to the conditioning rolls. The mowing apparatus is of a type well known in the art and comprises a plurality of transversely spaced guards 144 mounted along the front side of the beam 60, and an elongated sickle bar 146 reciprocable transversely through slots formed in the guards. Reciprocating motion is produced for driving the sickle bar by means of a conventional wobble drive mechanism contained within a housing 148 mounted on the extreme left end of the beam 60, the mechanism having a rotary input shaft with a drive sheave 150 mounted thereon.

Figure 6:
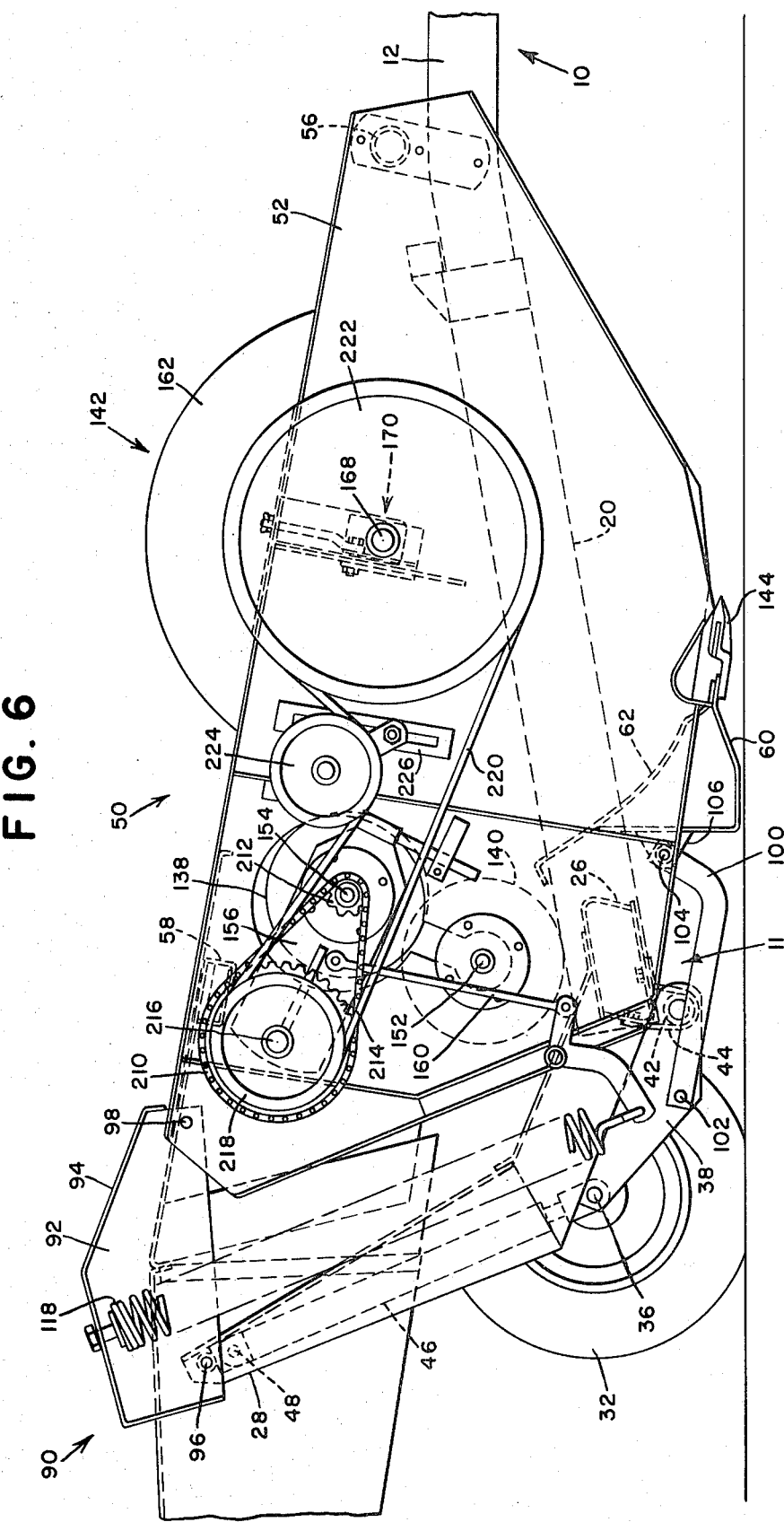
FIG. 6 is a fragmentary right side elevational view of the machine.
Figure 7:
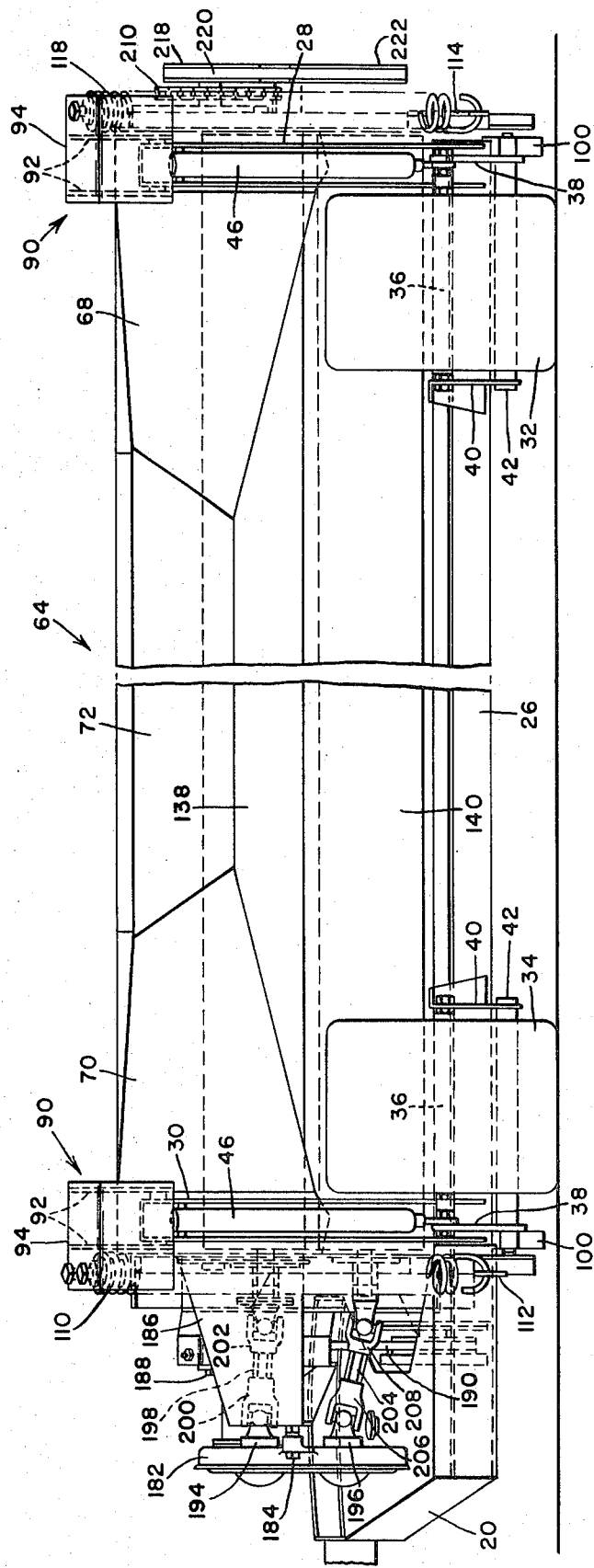
FIG. 7 is a rear elevational view of the machine on the same scale as FIG. 5.

As is clear from FIGS. 5 and 7 of the drawings, the crop conditioning rolls 138 and 140 extend the full width of the header 50, between the side panels 52 and 54. The lower crop conditioning roll 140 is supported on a shaft 152 which, in turn, is rotatably mounted at opposite ends on the header side panels 52 and 54. The upper roll 138 is supported on a shaft 154, the shaft 154 being supported at its ends on parallel arms 156 pivoted at 158 to the header side panels. It will be seen that the mounting for the upper roll permits the latter to move toward and away from the fixed position lower roll, along an arcuate path about the pivot 158. In the embodiment of the invention illustrated in FIGS. 1–7 of the drawings, a downward biasing force is exerted on the ends of the upper roll by means of the float springs 108 and 118, each of which is anchored at its lower end to one of the arms of a bell crank 114. In the embodiment illustrated in FIGS. 8 and 9, float springs 132 bias the upper roll toward the lower roll. In both embodiments, the other arm of each of the bell cranks is connected by means of a vertical connecting link 160 to one of the parallel arms 156 supporting the upper roll shaft 154. It will thus be apparent that the float springs serve the dual function of providing flotation for the header while simultaneously biasing the upper roll against the lower roll. Should a rock or other object be introduced between the rolls along with the crop material, the springs will stretch to allow the upper roll to move away from the lower roll a distance sufficient to pass the object without damaging the rolls or their supporting structure.

The reel 142, shown only schematically in the drawings, is also of conventional design and includes a pair of circular end panels 162 and 164 interconnected by a plurality of transverse pipe members 166. A central shaft 168 also interconnects the end panels 162 and 164 and is rotatably supported at its ends in the header end panels 52 and 54. An adjusting mechanism indicated generally by the numeral 170 is provided on the end panels at each end of the shaft 168 to permit adjustment of the reel height relative to the mowing apparatus. Conventionally, the reel pipe members 166 have a series of fingers mounted thereon which extend and retract as the reel rotates. The action of the fingers is controlled by a cam 172 mounted on the inner wall of the left side panel 52, the cam being engaged by cam followers (not shown), one of which is provided for the set of fingers mounted on each of the reel pipe members 166.

Power for driving the harvesting components on the header is supplied by the power take-off shaft on the rear of the tractor 16. A short, telescoping shaft 174 connects the tractor power take-off shaft to the front end of a main, longitudinal drive shaft 176 concealed in FIGS. 1 and 2 of the drawings by a shield 178. The rear end of the shaft 176 is connected by a universal joint 180 to the input shaft of a gear case 182 mounted on the outer side of the left header side panel 52. The harvesting component drive apparatus, including the manner in which the gear case 182 is mounted on the header side panel 52, is the subject of copending application Ser. No. 266,210. The rear portion of the gear case 182 is pivotally connected by means of a bolt 184 to a bracket 186 fixed to the panel 52. An additional pair of bolts 188, only one of which is visible in the drawings, secures the forward portion of the gear case 182 to the bracket 186, the bolts 188 being received in arcuate slots in the bracket 186 so that the gear case can be swung about the bolt 184 to various positions of adjustment when the bolts 188 are loosened. The gear case adjustment provided in this manner is for the purpose of maintaining proper tension in a belt 190 which drivingly connects an output sheave 192 on the front portion of the gear case with the sheave 150 on the input shaft of the wobble drive mechanism for the mowing apparatus. When the tension in this belt has decreased as a result of wear, the gear case can be adjusted upwardly to restore proper tension therein.

The gear case 182 further includes a pair of oppositely rotating output shafts 194 and 196 for driving the upper and lower conditioning rolls, respectively. A short, telescoping power shaft 198 is connected at its outer end through a universal joint 200 to the gear case output shaft 194 and at its inner end through a universal joint 202 to the upper roll shaft 154. A second telescoping power shaft 204 is connected at its outer end through a universal joint 206 to the gear case output shaft 196 and at its inner end through a universal joint 208 to the lower roll shaft 152. The flexible connections between the gear case output shafts 194 and 196 and the conditioning roll shafts 154 and 152, respectively, provide for misalignment between these shafts which occurs, in the case of both sets of shafts, as the position of the gear case is changed to tension the mowing apparatus drive belt 190, and, in the case of the upper set of shafts, when the upper roll moves away from the lower roll to pass an obstruction between the rolls.

The reel 142, as shown best in FIG. 6, is driven from the right side of the upper conditioning roll shaft 154. A chain 210 drivingly connects a sprocket 212 on the extreme right end of the upper roll shaft 154 with a sprocket 214 on a jackshaft 216 aligned with the pivot 158 of the upper roll support arm 156. Also mounted on and rotatable with the jackshaft 216 is a sheave 218 which is drivingly connected by means of a belt 220 to a sheave 222 on the right end of the reel shaft 168. An idler sheave 224, adjustably mounted on a bracket 226 on the right header side panel 52, is operative to maintain proper tension in the reel drive belt 220.

We claim:

1. A crop harvesting machine comprising: a longitudinal frame portion adapted at its forward end for attachment to a draft vehicle; a transverse frame portion rigidly fixed at one end to the rearward end of said longitudinal frame portion; a pair of transversely spaced upright frame members rigidly fixed at their lower ends to said transverse frame portion; a pair of longitudinally extending, transversely spaced wheel arm means pivotally connected at their forward ends to said transverse frame portion for vertical swinging movement, each of said wheel arm means having a ground-engaging wheel rotatably supported on its rearward end; extensible and retractable means interconnecting said upright frame members and said wheel arm means for vertically swinging the latter and thereby raising and lowering the frame portions relative to the ground; a header subframe carrying harvesting elements thereon, said header being disposed generally above and forwardly of said transverse frame portion and including a portion extending rearwardly between said upright frame members; lower, longitudinally extending link means interconnecting said wheel arm means and a lower portion of said header; upper, longitudinally extending link means interconnecting the upper end portions of said upright frame members and an upper portion of said header; and resilient means acting between said transverse frame portion and said header for urging the latter upwardly relative to the former.

2. The invention defined in claim 1 wherein said resilient means comprises spring means interconnecting said upper link means and said header.

3. The invention defined in claim 1 wherein said resilient means comprises spring means interconnecting the upper end portions of said upright frame members and said header.

4. The invention defined in claim 1 including stop means on said header engageable with one of said link means to limit the relative movement between said one link means and said header as the wheel arm means are swung downwardly to raise the frame portions relative to the ground.

5. The invention defined in claim 4 wherein said stop means are engageable with said lower link means to limit the upward movement of the header relative to the lower link means as the wheel arm means are swung downwardly.

6. The invention defined in claim 1 wherein said lower link means extend beneath the transverse frame portion.

7. The invention defined in claim 6 wherein the upper side of said lower link means is engageable with the lower side of said transverse frame portion to limit the upward movement of said header relative to said transverse frame portion.

8. The invention defined in claim 1 wherein the lower side of said header is engageable with the upper side of said transverse frame portion to limit the downward movement of said header relative to said transverse frame portion.

9. The invention defined in claim 1 including an upper and lower pair of cooperating, crop conditioning rolls mounted on said header, one of said rolls being mounted on said header for movement toward and away from the other of said rolls, and wherein said resilient means acts between said transverse frame portion and said one conditioning roll to simultaneously urge the header upwardly relative to the transverse frame portion and urge said one conditioning roll toward said other conditioning roll.

10. The invention defined in claim 9 including arm means mounting the upper of said crop conditioning rolls on said header for vertical swinging movement toward and away from the lower of said rolls, bell crank means mounted on said header, and link means interconnecting one arm of said bell crank means with said upper roll mounting arm means; and wherein said resilient means acts between the other arm of said bell crank means and said transverse frame portion.

11. The invention defined in claim 10 wherein said resilient means comprises spring means interconnecting the other arm of said bell crank means and said upper link means.

12. The invention defined in claim 10 wherein said resilient means comprises spring means interconnecting the other arm of said bell crank means and the upper end portions of said upright frame members.

13. The invention defined in claim 1 wherein said ground-engaging wheels are disposed inwardly of said upright frame members and beneath the portion of said header extending rearwardly between said upright frame members.

14. A pull-type crop harvesting machine comprising: a longitudinal frame portion adapted at its forward end for attachment to a draft vehicle; a transverse frame portion rigidly fixed at its left end to the rearward end of said longitudinal frame portion; right and left, transversely spaced upright frame members rigidly fixed at their lower ends to the respective end portions of the transverse frame portion; right and left, transversely spaced wheel arms pivotally connected to the transverse frame portion adjacent to the lower ends of the respective upright frame members, each of said wheel arms extending rearwardly from its pivotal connection with the transverse frame portion and having a ground-engaging wheel rotatably supported on its rearward end; right and left, extensible and retractable means interconnecting the respective upright frame member and wheel arm to vertically swing the latter and thereby raise and lower the frame portions relative to the ground; a header subframe carrying harvesting elements thereon, said header being disposed generally above and forwardly of said transverse frame portion and including a portion extending rearwardly between said upright frame members; right and left, longitudinally extending lower links pivotally connected at their rearward ends to intermediate portions of the respective wheel arms, said lower links extending forwardly therefrom beneath said transverse frame portion and being pivotally connected at their forward ends to lower portions of said header; right and left, longitudinally extending upper links pivotally connected at their rearward ends to the upper ends of the respective upright frame members and at their forward ends to upper portions of said header; and right and left, vertically extending spring means connected at their upper ends to the upper ends of the respective upright frame members and at their lower ends to the header.

15. The invention defined in claim 14 wherein said ground-engaging wheels are disposed inwardly from said upright frame members and said spring means are disposed outwardly from said upright frame members.

16. The invention defined in claim 14 wherein said upright frame members are formed of rearwardly opening, U-shaped channels, and wherein said extensible and retractable means comprise hydraulic cylinders disposed between the walls of said channels.

17. A pull-type crop harvesting machine comprising: a longitudinal frame portion adapted at its forward end for attachment to a draft vehicle; a transverse frame portion rigidly fixed at its left end to the rearward end of said longitudinal frame portion; right and left, transversely spaced upright frame members rigidly fixed at their lower ends to the respective end portions of the transverse frame portion; right and left, transversely spaced wheel arms pivotally connected to the transverse frame portion adjacent to the lower ends of the respective upright frame members, each of said wheel arms extending rearwardly from its pivotal connection with the transverse frame portion and having a ground-engaging wheel rotatably supported on its rearward end; right and left, extensible and retractable means interconnecting the respective upright frame member and wheel arm to vertically swing the latter and thereby raise and lower the frame portions relative to the ground; a header subframe carrying harvesting elements thereon, said header being disposed generally above and forwardly of said transverse frame portion and including a portion extending rearwardly between said upright frame members; right and left, longitudinally extending lower links pivotally connected at their rearward ends to intermediate portions of the respective wheel arms, said lower links extending forwardly therefrom beneath said transverse frame portion and being pivotally connected at their forward ends to lower portions of said header; right and left, longitudinally extending upper links pivotally connected at their rearward ends to the upper ends of the respective upright frame members and at their forward ends to upper portions of said header; and right and left, vertically extending spring means connected at their upper ends to intermediate portions of the respective upper links and at their lower ends to the header.

18. A harvesting machine comprising: a mobile main frame including a transverse portion; a transversely elongated header carrying crop harvesting elements and disposed generally forwardly of the transverse main frame portion; a pair of upper link means pivotally connected at their rearward ends to the transverse portion of the main frame and at their forward ends to the header; a pair of lower link means; first transverse pivot means connecting the forward ends of the lower links to the header; means pivotally connecting the rearward ends of the lower links to the main frame, and including second transverse pivot means; means pivotally connecting the rearward ends of the lower links to the main frame, and including second transverse pivot means; hydraulic cylinder means having one end operatively connected to the main frame; connecting means operatively connecting the other end of the cylinder means to the header so that actuation of the cylinder raises and lowers the header relative to the main frame; and stop means operatively associated with the lower link means for limiting the swinging of the lower link means about the first pivot means after a predetermined amount of upward movement of the header relative to the main frame.

19. The invention defined in claim 18 wherein the connecting means connecting the cylinder means to the header includes said lower link means.

20. The invention defined in claim 18 wherein the means connecting the rearward ends of the lower links to the main frame includes a pair of rearwardly extending wheel arms pivotally connected to the transverse portion of the main frame adjacent their forward ends for swinging in a vertical arc relative to the main frame and having ground-engaging wheels adjacent their rearward ends, the second transverse pivot means connecting the lower links to the wheel arms.

21. The invention defined in claim 20 wherein the connecting means connecting the hydraulic cylinder means to the header includes said wheel arms and said lower links, so that extension of the cylinder means swings the wheel arms downwardly relative to the main frame to raise the latter, the downward movement of the wheel arms causing the lower links to swing about said first pivot means until the lower link engages the stop means, additional extension of the cylinder means raising the header about the wheel arm pivot connections to the main frame.

* * * * *